United States Patent
Mihan et al.

(10) Patent No.: US 7,259,216 B2
(45) Date of Patent: Aug. 21, 2007

(54) METHOD FOR PRODUCING HIGHLY BRANCHED ETHYLENE POLYMERS

(75) Inventors: Sharam Mihan, Ludwigshafen (DE); Dieter Lilge, Limburgerhof (DE); Jan Göhre, Ibbenbühren (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/381,366

(22) PCT Filed: Sep. 28, 2001

(86) PCT No.: PCT/EP01/11239

§ 371 (c)(1),
(2), (4) Date: Mar. 25, 2003

(87) PCT Pub. No.: WO02/31001

PCT Pub. Date: Apr. 18, 2002

(65) Prior Publication Data

US 2004/0097666 A1    May 20, 2004

(30) Foreign Application Priority Data

Sep. 28, 2000   (DE)   .................. 100 49 276

(51) Int. Cl.
C08F 4/6392   (2006.01)
C08F 4/69   (2006.01)
(52) U.S. Cl. ............... 526/161; 526/160; 526/165; 526/169; 526/943; 502/103; 502/155
(58) Field of Classification Search ............... 526/160, 526/161, 165, 352, 943, 169; 502/103, 155
See application file for complete search history.

(56) References Cited

U.S. PATENT DOCUMENTS

| | | | |
|---|---|---|---|
| 5,023,388 A | 6/1991 | Lueker | |
| 5,750,813 A | 5/1998 | Hess | |
| 6,143,846 A | 11/2000 | Herrmann | |
| 6,255,418 B1 * | 7/2001 | Jolly et al. | .................. 526/160 |
| 6,437,161 B1 | 8/2002 | Mihan | |
| 6,468,948 B1 * | 10/2002 | Rossi et al. | .................. 508/591 |

FOREIGN PATENT DOCUMENTS

| | | |
|---|---|---|
| DE | 19710 615 | 9/1998 |
| DE | 199 19615 | 6/2000 |
| DE | 199 60123 | 6/2001 |
| DE | 100 09114 | 8/2001 |
| EP | 321 851 | 6/1989 |
| EP | 602 509 | 6/1994 |
| EP | 890 584 | 1/1999 |
| WO | 96/23010 | 8/1996 |
| WO | 01/02323 | 1/2001 |
| WO | 01/12641 | 2/2001 |
| WO | 01/98415 | 12/2001 |

OTHER PUBLICATIONS

J.Am.Chem.Soc.1995,117,6414-6415, Johnson.
Org.2000,19, 388-402, Doehring et al.
Organometallics 1996, 15,2213-2226, Koide et al.
Macromol.Symp.97,15-25(1995) Barron.
Kunststoffe 86(1996)7, Leissler et al.
Organische Pigmente,Bd.18,S.661 ff; Thieme Verlag 1977.
Ull.Enc.DerTechn.Chem.,4.Auflange,Bd 18,S.547ff.

* cited by examiner

Primary Examiner—Caixia Lu
(74) Attorney, Agent, or Firm—Novak Druce & Quigg, LLP

(57) ABSTRACT

A process for preparing highly branched ethylene polymers comprises polymerizing ethylene over a catalyst system comprising a compound of the formula Ia or Ib

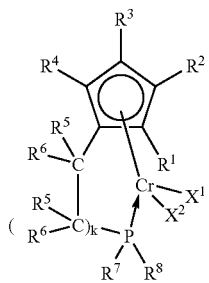

Ia

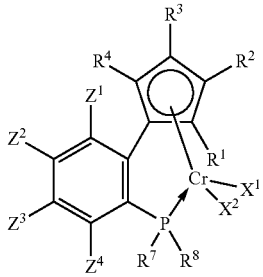

Ib and an activator, where the process is carried out at from 40 to 110° C. and a pressure of from 10 to 100 bar.

14 Claims, No Drawings

METHOD FOR PRODUCING HIGHLY BRANCHED ETHYLENE POLYMERS

The present invention relates to a process for preparing highly branched ethylene polymers, which comprises polymerizing ethylene over a catalyst system comprising a compound of the formula I a or I b

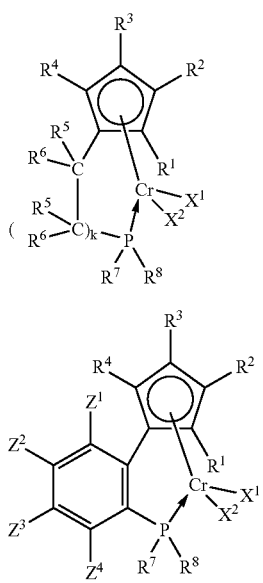

and an activator, where the variables in the formulae I a and I b are defined as follows:

$X^1$, $X^2$ are identical or different and are selected from among halide, trifluoroacetate, $BF_4{-}$, $PF_6{-}$ or $SbF_6{-}$, $C_1$-$C_8$-alkyl, $C_7$-$C_{13}$-aralkyl, $C_6$-$C_{14}$-aryl, $C_1$-$C_6$-alkoxy and $NR^9R^{10}$, where $R^9$ and $R^{10}$ are selected independently from among hydrogen, $C_1$-$C_8$-alkyl, $C_2$-$C_{12}$-alkenyl and $C_6$-$C_{14}$-aryl, which may form a saturated or unsaturated 5- to 10-membered ring;

$R^1$ to $R^6$ are identical or different and are selected from among hydrogen, $C_1$-$C_8$-alkyl, substituted or unsubstituted, $C_3$-$C_{12}$-cycloalkyl, substituted or unsubstituted, $C_2$-$C_{12}$-alkenyl, $C_7$-$C_{13}$-aralkyl, $C_6$-$C_{14}$-aryl, unsubstituted or substituted by one or more identical or different substitutents selected from among $C_1$-$C_8$-alkyl, substituted or unsubstituted, $C_3$-$C_{12}$-cycloalkyl, $C_7$-$C_{13}$-aralkyl, $C_6$-$C_{14}$-aryl, halogen, $C_1$-$C_6$-alkoxy, $C_6$-$C_{14}$-aryloxy, $SiR^{11}R^{12}R^{13}$ and $O\!-\!SiR^{11}R^{12}R^{13}$, where $R^{11}$ to $R^{13}$ are selected from among $C_1$-$C_8$-alkyl, $C_3$-$C_{12}$-cycloalkyl, $C_7$-$C_{13}$-aralkyl or $C_6$-$C_{14}$-aryl;

k is 0, 1, 2 or 3, $Z^1$ to $Z^4$ are identical or different and are selected from among hydrogen, $C_1$-$C_8$-alkyl, substituted or unsubstituted, $C_3$-$C_{12}$-cycloalkyl, substituted or unsubstituted, $C_2$-$C_{12}$-alkenyl, halogen, $NO_2$, $C_7$-$C_{13}$-aralkyl or $C_6$-$C_{14}$-aryl, $R^7$, $R^8$ are identical or different and are selected from among branched $C_3$-$C_8$-alkyl, $C_3$-$C_{12}$-cycloalkyl, α-substituted $C_3$-$C_{12}$-alkenyl, and the process is carried out at from 40 to 110° C. and a pressure of from 10 to 100 bar.

Polyolefins such as polyethylene and polypropylene and also copolymers of ethylene or propylene with other olefins are of great industrial and economic importance as materials because they have a broad range of uses and the monomers are obtainable cheaply in large quantities. Their suitability as materials is determined by the structure of the macromolecules and parameters such as molecular weight, molecular weight distribution, degree of branching, distribution of the branches or amount and homogeneity of incorporation of comonomers. The polymerization process and particularly the catalyst used have a particularly important influence on the structure of the polymer.

Ziegler-Natta catalysts generally give polyethylenes or polypropylenes having a broad molecular weight distribution and an inhomogeneous incorporation of comonomer, i.e. longer polymer chains contain less comonomer than shorter chains. Analogously, the longer chains generally have fewer branching points than the shorter chains. Ziegler-Natta catalysts can be regulated by means of hydrogen, i.e. the mean molecular weight generally decreases.

Phillips catalysts generally produce a polyethylene having a very broad distribution. Good hydrogen regulatability is generally not observed.

Metallocene catalysts make it possible to prepare polyethylenes having a narrow molecular weight distribution and a homogeneous incorporation of comonomer. Metallocenes can also be regulated by means of hydrogen (EP-A 0 321 851). However, the number of branches is still too low for some applications. In addition, comonomers have to be added to obtain the branches.

WO 96/23010 and L. K. Johnson et al., *J. Am. Chem. Soc.* 1995, 117, 6414, describe Ni and Pd complexes by means of which, after activation with methylaluminoxane, ethylene can be polymerized to give highly branched ethylene polymers. However, the activity of the Pd complexes proposed is often unsatisfactory for industrial processes. In addition, Pd compounds are expensive. The Ni systems disclosed lead to traces of Ni in the product, which raises toxicological concerns.

DE-A 199 10 615 describes Cr complexes of the formula A,

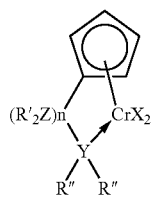

where, for example, X may be halide or amide or alkyl, Y is a donor atom of group 15 of the Periodic Table of the Elements, R' and R" are H, alkyl or organic groups and n is 1. These complexes are able, after reaction with activators such as methylaluminoxane, to polymerize ethylene to give highly linear ethylene polymers which, however, are disadvantageous for numerous industrial applications because of their brittleness. The authors set a temperature profile during the polymerization, i.e. a temperature rise of 8° C. or more is observed between initial temperature of the polymerization and the temperature at which the experiment is stopped (Examples 8 to 12). Although the polymerization is carried out under virtually isothermal conditions in Example 13, the activity of the catalyst system disclosed is only 328 kg of polyethylene/mol of Cr.h, which is unsatisfactory for industrial applications.

DE-A 100 29 327 discloses masterbatches and a process for preparing polyolefin waxes for the production of masterbatches, where the waxes are prepared with the aid of catalysts based on complexes of elements of groups 5 to 8 of the Periodic Table of Elements. However, the masterbatches produced are still capable of improvement in terms of their use properties.

However, processes for the polymerization and copolymerization of ethylene to give high molecular weight, highly branched polymers are particularly attractive for numerous applications, for example as wax components in pigment concentrates, i.e. "masterbatches". For the present purposes, highly branched ethylene polymers are polymers which have more than 5 methyl groups per 1000 carbon atoms, determined by IR spectroscopy.

Numerous pigments are marketed in the form of a pigment concentrate, since this aids processing when coloring plastics. These formulations generally comprise the pigment together with a dispersant, for example a wax, and, if appropriate, a thermoplastic, usually a polyolefin. The thermoplastic is also referred to as carrier polymer. The wax serves to disperse the pigment finely in the formulation and to stabilize this dispersion. A commercial formulation of such a pigment concentrate ("masterbatch") contains 25% by weight of pigment, 10% by weight of wax and 65% by weight of a polyethylene. The wax used is frequently a polyethylene wax which can be obtained, for example, by free-radical polymerization or Ziegler-Natta polymerization. The polyethylene wax may be modified to introduce polar groups, for example by oxidation. The ratios of the individual components can be varied within certain limits.

A critical prerequisite for the usability of such a pigment concentrate is the correct choice of the wax component. Although not colored itself, it influences the brilliance of the pigment concentrate. For more detailed information, see, for example, the product brochure "Luwax®- Anwendung in Pigmentkonzentraten" on polyethylene waxes from BASF AG.

The pigment agglomerates have to be wetted well by the wax so as to prevent clumping together of the agglomerates. A small number of larger pigment agglomerates makes a lesser contribution to the coloring effect of the pigment concerned than does a larger number of smaller pigment agglomerates.

It is therefore an objective to prevent larger pigment agglomerates from being formed during the formulation process. Furthermore, it is desirable to separate any previously formed agglomerated pigments and to split them up into primary particles. Finally, the primarly particles should remain separate even after the formulation process and not aggregate again during cooling.

To achieve this, the wax has to meet a number of requirements. One of these requirements concerns the viscosity of the melt. The viscosity of the melt should be very low, so that the molten wax can penetrate readily through the voids within the pigment agglomerates during formulation, which is usually carried out by mixing at a temperature above the melting point of the wax. The shear forces applied in this way break up the agglomerates into primary particles more readily.

The wettability of the waxes should also be good.

It has been found that many pigment concentrates have insufficient brilliance for high-quality applications. The solution to this problem can be achieved to only a limited extent by a larger proportion of pigment. The price of the pigment is the decisive factor in the production cost of a pigment concentrate. For this reason, a larger proportion of pigment would be economically disadvantageous.

Conversely, it may also be desirable to have available an equivalent pigment concentrate containing a smaller proportion of the expensive pigment for less demanding applications.

Finally, it has been found that the brilliance of the masterbatches no longer increases significantly at high pigment concentrations, which is attributable to dispersion of the pigment no longer being satisfactory. Poorly dispersed agglomerates can be confirmed, for example, by microscopic examination.

It is therefore desirable to have available waxes for pigment concentrates which have particularly good dispersability and particularly good wettability. Waxes having a very uniform structure should be well suited to achieving this.

Polymers and copolymers having a uniform structure are obtainable from olefins by means of catalysis using single-site catalysts. It is known from EP-A 0 602 509 that waxes can be obtained by reacting olefins in the presence of hydrogen over metallocenes which have been activated by means of a cocatalyst. Use examples are not given.

EP-A 0 890 584 specifically discloses the use of metallocene polypropylene waxes having an isotacticity index of greater than 70% for masterbatches. However, a disadvantage of the use of metallocenes is that specific racemic isomers of the metallocenes are necessary for producing isotactic polypropylene. The meso isomer formed in the customary syntheses has to be separated off and then either discarded or converted into the desired racemate in a further step.

DE-A 100 09 114 discloses polyethylene waxes having a broad molecular weight distribution which can be prepared by means of chromocene $Cp_2Cr$ catalysis. They are suitable for use in masterbatches. Polyethylene waxes are also known from PCT/EP/01/06689.

It is an object of the present invention to provide a process by means of which
highly branched ethylene polymers can be prepared from ethylene monomers,
to provide a catalyst system suitable for this process,
to use the ethylene polymers obtainable in this way in masterbatches by means of which plastic moldings and plastic sheets can be colored and which have, compared to the prior art, improved brilliance without the percentage of pigment having to be increased,
to provide a process for producing these concentrates,
to produce plastic moldings and plastic sheets colored by means of the pigment concentrates of the present invention, and to find a method of coloring thermoplastic polymers and moldings using the concentrates of the present invention.

We have found that this object is achieved by the process defined at the outset. The variables in the formulae I a and I b are defined as follows:

$X^1$, $X^2$ are selected from among halogen such as fluorine, chlorine, bromine and iodine, particularly preferably chlorine and bromine;

trifluoroacetate, $BF_4^-$, $PF_6^-$ and $SbF_6^-$, $C_1$-$C_8$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$-$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$-$C_4$-alkyl such as methyl, ethyl, n-propyl and n-butyl;

$C_7$-$C_{13}$-aralkyl, preferably $C_7$-$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl, $C_6$-$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

$C_1$-$C_6$-alkoxy, such as methyloxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methyoxy, ethoxy, n-propoxy and n-butoxy and $NR^9R^{10}$, where $R^9$ and $R^{10}$ are selected independently from among hydrogen, $C_1$-$C_8$-alkyl, $C_2$-$C_{12}$-alkenyl and $C_6$-$C_{14}$-aryl which may form a saturated or unsaturated 5- to 10-membered ring; preferably the dimethylamino, diethylamino, diisopropylamino, methylphenylamino and diphenylamino groups. Examples of amino groups having saturated rings are the N-piperidyl group and the N-pyrrolidinyl group; examples of amino groups having unsaturated rings are the N-pyrryl group, the N-indolyl group and the N-carbazolyl group.

$X^1$ and $X^2$ are preferably identical. $X^1$ and $X^2$ are particularly preferably each halogen or $BF_4^-$ and are very particularly preferably each chlorine or bromine.

$R^1$ to $R^6$ are each, independently of one another, hydrogen, $C_1$-$C_8$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl and n-octyl; preferably $C_1$-$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$-$C_4$-alkyl such as methyl, ethyl, n-propyl, isopropyl, n-butyl, isobutyl, sec-butyl and tert-butyl, $C_1$-$C_8$-alkyl substituted by one or more donor atoms, e.g. noncyclic or cyclic ethers, alcohols, ketals, thioethers and amines; for example methoxymethyl, ethoxymethyl, ethoxyethyl, β-hydroxyethyl, ω-ethoxypropyl, (2-ethylhexyloxy)propylidene, methoxyethoxypropylidene and ω-dimethylaminopropyl;

monohalogenated and polyhalogenated $C_1$-$C_8$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_2$-$C_{12}$-alkenyl, preferably $C_2$— to ω-$C_8$-alkenyl such as vinyl, allyl, but-3-en-1-yl, ω-penteneyl, ω-hexeneyl, ω-heptenyl, and ω-octenyl;

$C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$C_7$-$C_{13}$-aralkyl, preferably $C_7$-$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl, $C_6$-$C_{14}$-aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl, silyl $SiR^{11}R^{12}R^{13}$, where $R^{11}$ to $R^{13}$ are selected independently from among hydrogen, $C_1$-$C_{12}$-alkyl, $C_7$-$C_{13}$-aralkyl and $C_6$-$C_{14}$-aryl; preferably the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particularly preferably the trimethylsilyl group and the tert-butyldimethylsilyl group;

siloxy $OSiR^{11}R^{12}R^{13}$, where $R^{11}$ to $R^{13}$ are selected independently from among hydrogen, $C_1$-$C_{12}$-alkyl, $C_7$-$C_{13}$-aralkyl and $C_6$-$C_{14}$-aryl; preferably the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and tri-para-xylylsilyloxy groups; particularly preferably the trimethylsilyloxy group and the tert-butyldimethylsilyloxy group;

$C_1$-$C_6$-alkoxy, such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$-$C_{14}$-aryl which is in turn substituted by one or more $C_1$-$C_{12}$-alkyl, $C_1$-$C_{12}$-alkenyl, $C_3$-$C_{12}$-cycloalkyl, $C_6$-$C_{14}$-aryl, silyl $SiR^{11}R^{12}R^{13}$, siloxy $OSiR^{11}R^{12}R^{13}$ and $C_1$-$C_6$-alkoxy groups, where these groups are as specified above.

In a particular embodiment of the present invention, two adjacent radicals together with the parent aromatic may form a 5- to 10-membered ring. Thus, for example, $R^3$ and $R^4$ in formula I a or I b may together be: —(CH$_2$)$_3$— (trimethylene), —(CH$_2$)$_4$—(tetramethylene), —(CH$_2$)$_5$— (pentamethylene), —(CH$_2$)$_6$—(hexamethylene), —CH$_2$—CH═CH—, —CH$_2$—CH═CH—CH$_2$—, —CH═CH—CH═CH—, —O—CH$_2$—O—, —O—CH(CH$_3$)—O—, —O—CH—

($C_6H_5$)—O—, —O—$CH_2$—$CH_2$—O—, —O—C($CH_3$)$_2$—O—, —$NCH_3$—$CH_2$—$CH_2$—$NCH_3$—, —$NCH_3$—$CH_2$—$NCH_3$ or —O—Si($CH_3$)$_2$—O—.

In formula I b, $Z^1$ to $Z^4$ are identical or different and are selected from among hydrogen, halogen such as fluorine, chlorine, bromine or iodine, preferably chlorine and bromine;

$C_1$-$C_8$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl or n-octyl; preferably $C_1$-$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably $C_1$-$C_4$-alkyl such as methyl, ethyl, n-propyl, isopropyl, n-butyl, isobutyl, sec-butyl and tert-butyl, $C_1$-$C_8$-alkyl substituted by one or more donor atoms, e.g. noncyclic or cyclic ethers, alcohols, ketals, thioethers and amines; for example methoxymethyl, ethoxymethyl, ethoxyethyl, β-hydroxyethyl, ω-ethoxypropyl, (2-ethylhexyloxy)propylidene, methoxyethoxypropylidene and ω-dimethylaminopropyl;

monohalogenated and polyhalogenated $C_1$-$C_8$-alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particularly preferably fluoromethyl, difluoromethyl, trifluoromethyl and perfluorobutyl;

$C_2$-$C_{12}$-alkenyl, preferably $C_2$- to ω-$C_8$-alkenyl such as vinyl, allyl, but-3-en-1-yl, ω-penteneyl, ω-hexeneyl, ω-hepteneyl, and ω-octeneyl;

$C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

$NO_2$, $C_7$-$C_{13}$-aralkyl, preferably $C_7$-$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl, $C_6$-$C_{14}$-aryl such asphenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl, silyl $SiR^{11}R^{12}R^{13}$, where $R^{11}$ to $R^{13}$ are selected independently from among hydrogen, $C_1$-$C_8$-alkyl, $C_7$-$C_{13}$-aralkyl and $C_6$-$C_{14}$-aryl; preferably the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particularly preferably the trimethylsilyl group and the tert-butyldimethylsilyl group;

siloxy $OSiR^{11}R^{12}R^{13}$, where $R^{11}$ to $R^{13}$ are selected independently from among hydrogen, $C_1$-$C_8$-alkyl, $C_7$-$C_{13}$-aralkyl and $C_6$-$C_{14}$-aryl; preferably the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and tri-para-xylylsilyloxy groups; particularly preferably the trimethylsilyloxy group and the tert-butyldimethylsilyloxy group;

$C_1$-$C_6$-alkoxy, preferably $C_1$-$C_6$-alkoxy such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy;

$C_6$-$C_{14}$-aryl which is in turn substituted by one or more $C_1$-$C_8$-alkyl, $C_1$-$C_{12}$-alkenyl, $C_3$-$C_{12}$-cycloalkyl, $C_6$-$C_{14}$-aryl, silyl $SiR^1R^{12}R^{13}$, siloxy $OSiR^{11}R^{12}R^{13}$ and $C_1$-$C_6$-alkoxy groups, where these groups are as specified above.

In a particular embodiment of the present invention, two adjacent radicals together with the parent aromatic may form a 5- to 10-membered ring. Thus, for example, $R^3$ and $R^4$ or $Z^1$ and $Z^2$ in formula I b may together be: —($CH_2$)$_3$— (trimethylene), —($CH_2$)$_4$ (tetramethylene), —($CH_2$)$_5$— (pentamethylene), —($CH_2$)$_6$—(hexamethylene), —$CH_2$—CH=CH—, —$CH_2$—CH=CH—$CH_2$—, —CH=CH—CH=CH—, —O—$CH_2$—O—, —O—CH($CH_3$)—O—, —O—CH—($C_6H_5$)—O—, —O—$CH_2$—CH$_2$—O—, —O—C($CH_3$)$_2$—O—, —$NCH_3$—$CH_2$—$CH_2$—$NCH_3$—, —$NCH_3$—$CH_2$—$NCH_3$— or —O—Si($CH_3$)$_2$—O—.

In formulae I a and I b, $R^7$, $R^8$ are identical or different and are selected from among branched $C_3$-$C_8$-alkyl, for example isopropyl, sec-butyl, tert-butyl, sec-pentyl, neopentyl, 1,2-dimethylpropyl, sec-hexyl and sec-octyl; particularly preferably isopropyl, sec-butyl and tert-butyl, $C_3$-$C_{12}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;

a-substituted $C_3$-$C_{12}$-alkenyl, particularly preferably isopropenyl.

In a particular embodiment of the present invention, $R^7$ and $Z^4$ in formula I b may together with the parent phenyl system form a 5- to 10-membered ring. Thus, for example $R^7$ and $Z^4$ together with the parent phenyl system can form a benzo[b]phosphole system.

k in the formula I a is 0, 1, 2 or 3 and is preferably 1 or 2, particularly preferably 1. The radicals $R^5$ and $R^6$ can be identical or different and are preferably identical. If a plurality of radicals. $R^5$ or $R^6$ are present, the radicals $R^5$ and/or $R^6$ may also be different among themselves. Particularly preferred bridges $CR^5R^6$—($CR^5R^6$)$_k$ in the formula I a are —$CH_2$—$CH_2$—, —C($CH_3$)$_2$—C($CH_3$)$_2$— and —$CH_2$—$CH_2$—$CH_2$—.

The preparation of transition metal complexes of the formulae I a and I b is known per se. Suitable syntheses for complexes of the formulae I a and b may be found in DE-A 197 10 615 and in A. Döhring et al., *Organometallics* 2000, 19, 388.

Activators which can be used as constituents of the catalyst systems of the present invention are selected aluminum or boron compounds having electron-withdrawing groups (e.g. trispentafluorophenylborane, trispentafluorophenylaluminum, N,N-dimethylanilinium tetrakispentafluorophenylborate, tri-n-butylammonium tetrakispentafluorophenylborate, N,N-dimethylanilinium tetrakis(3,5- bisperfluoromethylphenyl)borate, tri-n-butylammonium tetrakis(3,5-bisperfluoromethylphenyl)borate and tritylium tetrakispentafluorophenylborate). Preference is given to dimethylanilinium tetrakis pentafluorophenylborate, tritylium tetrakispentafluorophenylborate and trispentafluorophenylborane.

Another class of suitable activators consists of aluminoxanes. The structure of the aluminoxanes is not known precisely. They are products which are obtained by careful partial hydrolysis of aluminum alkyls (cf. DE-A 30 07 725). These products are not compounds having a uniform chemical structure, but rather mixtures of open-chain and cyclic structures of the types II a and II b. These mixtures are presumably in dynamic equilibrium.

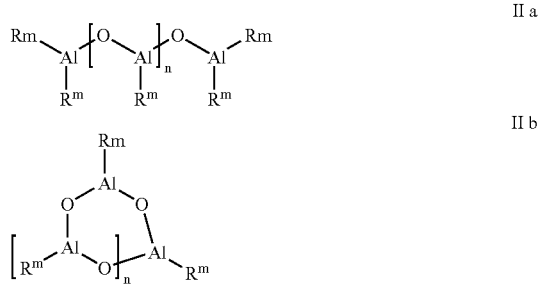

In formulae II a and II b, the radicals $R^m$ are each, independently of one another, $C_1$-$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, and n-dodecyl; preferably $C_1$-$C_6$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, particularly preferably methyl;

$C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl or cycloheptyl;

$C_7$-$C_{20}$-aralkyl, preferably $C_7$-$C_{12}$-phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, particularly preferably benzyl, or $C_6$-$C_{14}$-aryl such asphenyl, 1-naphthyl, 2-naphthyl, 1-anthryl, 2-anthryl, 9-anthryl, 1-phenanthryl, 2-phenanthryl, 3-phenanthryl, 4-phenanthryl or 9-phenanthryl, preferably phenyl, 1-naphthyl or 2-naphthyl, particularly preferably phenyl; and is an integer from 0 to 40, preferably from 1 to 25 and particularly preferably from 2 to 22.

Cage-like structures are also discussed in the literature for aluminoxanes (Y. Koide, S. G. Bott, A. R. Barron *Organometallics* 1996, 15, 2213-26; A. R. Barron *Macromol. Symp.* 1995, 97, 15-25). Regardless of the actual structure of the aluminoxanes, they are suitable as activators of the complexes of the formulae I a and I b.

Mixtures of various aluminoxanes are particularly preferred activators in cases in which polymerization is carried out in a solution in a paraffin, for example n-heptane or isododecane. A particularly preferred mixture is the CoMAO of the formula $[(CH_3)_{0.9}(isoC_4H_9)_{0.1}AlO]_n$ available commercially from Witco GmbH.

Possible pressures in the process of the present invention are from 10 to 100 bar, preferably from 15 to 80 bar and particularly preferably from 20 to 75 bar. At lower pressures, the catalyst often has insufficient activity or the molar masses are too low. On the other hand, the degree of branching of the ethylene polymers is reduced as the pressure increases. In the process of the present invention, it has surprisingly been found that a higher degree of branching is achieved at higher temperatures. The reaction temperature is therefore in a range from 40 to 110° C., preferably from 50 to 100° C., particularly preferably from 50 to 80° C.

The polymerization can be carried out in a known manner in bulk, in suspension, in the gas phase or in a supercritical medium in the customary reactors used for the polymerization of olefins. It can be carried out batchwise or preferably continuously in one or more stages. Solution processes, suspension processes, stirred gas phase processes or gas-phase fluidized-bed processes are all possible. As solvent or suspension medium, it is possible to use inert hydrocarbons, for example isobutane, or else the monomers themselves.

For the complexes of the formulae I a and I b to be able to be used in suspension processes, bulk polymerization processes or gas-phase processes, it is advantageous to immobilize them on a solid support. Otherwise, polymer morphology problems (lumps, deposits on the wall, blockages in lines or heat exchangers) can occur and force shutdown of the plant.

Catalyst systems comprising complexes of the formulae I a and I b and activator can readily be deposited on a solid support. Possible support materials are, for example, porous metal oxides of metals of groups 2-14 or mixtures thereof, also sheet silicates and solid halides of metals of groups 1, 2 and 13 and polymers such as polyethylene or polypropylene. Preferred examples of metal oxides of elements of groups 2-14 are $SiO_2$, $B_2O_3$, $Al_2O_3$, MgO, CaO and ZnO. Preferred sheet silicates are montmorillonites or bentonites; preferred halides are $MgCl_2$ and amorphous $AlF_3$.

Particularly preferred support materials are spherical silica gels and aluminosilicate gels of the formula $SiO_2 \cdot a\ Al_2O_3$, where a is generally from 0 to 2, preferably from 0 to 0.5. Such silica gels are commercially available, e.g. Silica Gel 332, Sylopol® 948 or Sylopol 952 or S 2101 from W.R. Grace or ES 70× from Crosfield.

Particle sizes which have been found to be useful for the support material are mean particle diameters of 1-300 μm, preferably from 20 to 80 μm, with the particle diameter being determined by known methods such as sieve methods. The pore volume of the supports is from 1.0 to 3.0 ml/g, preferably from 1.6 to 2.2 ml/g and particularly preferably from 1.7 to 1.9 ml/g. The BET surface area is from 200 to 750 m²/g, preferably from 250 to 400 m²/g.

To remove impurities, in particular moisture, adhering to the support material, the support materials can be baked before doping. Temperatures suitable for baking are from 45 to 1000° C. Temperatures of from 100 to 750° C. are particularly suitable for silica gels and other metal oxides, while the temperature range from 50 to 100° C. is preferred for MgCl$_2$ supports. This baking should be carried out for from 0.5 to 24 hours, preferably from 1 to 12 hours. The pressure conditions are not critical per se; baking be carried out at atmospheric pressure, but it is advantageous to employ reduced pressures of from 0.1 to 500 mbar. A range from 1 to 100 mbar is particularly advantageous and a range from 2 to 20 mbar is very particularly advantageous. Chemical pretreatment of the support material is also possible.

The doping of the catalyst is generally carried out by slurrying the support material in a suspension medium and combining this suspension with the solution of the chromium complex and the activator. The volume of the suspension medium is from 1 to 20 times the pore volume of the catalyst support. The catalyst can subsequently be separated from the suspension medium by a suitable method such as filtration, centrifugation or evaporation.

To achieve better control of the morphology, the catalyst can be prepolymerized using small amounts of monomer prior to the actual polymerization. The prepolymerization can be stopped by introducing a reversible catalyst poison or by stubbing the monomer feed, and the prepolymerized catalyst can subsequently be metered into the polymerization plant. Suitable comonomers for prepolymerization are α-olefins, for example from 0.1 to 20 mol % of 1-butene, 1-pentene, 1-hexene, 4-methyl-1-pentene, 1-octene, 1-decene or 1-undecene. However, isobutene is also a suitable comonomer.

Furthermore, the catalyst system can also be reacted with a compound of the formula (XI),

$$M(R^A)_r(R^B)_s(R^C)_t \quad\quad (XI)$$

where

M is an alkali metal, an alkaline earth metal or a metal of group 13 of the Periodic Table, i.e. boron, aluminium, gallium, indium or thallium, $R^A$ is hydrogen, $C_1$-$C_{10}$-alkyl, $C_6$-$C_{15}$-aryl, alkylaryl or arylalkyl each having from 1 to 10 carbon atoms in the alkyl part and from 6 to 20 carbon atoms in the aryl part, $R^B$ and $R^C$ are each hydrogen, halogen, $C_1$-$C_{10}$-alkyl, $C_6$-$C_{15}$-aryl, alkylaryl, arylalkyl or alkoxy each having from 1 to 10 carbon atoms in the alkyl part and from 6 to 20 carbon atoms in the aryl part, r is an integer from 1 to 3 and s and t are integers from 0 to 2, where the sum r+s+t corresponds to the valence of M.

It has been found that the addition of the compounds of the formula (XI) makes it possible to influence the molecular weight of the highly branched ethylene polymers.

Among the metal compounds of the formula (XI), preference is given to those in which M is lithium, magnesium or aluminum and $R^B$ and $R^C$ are each $C_1$-$C_{10}$-alkyl.

Particularly preferred metal compounds of the formula (XI) are n-butyllithium, n-butyl-n-octylmagnesium, n-butyl-n-heptylmagnesium, tri-n-hexylaluminum, tri-isobutylaluminum, triethylaluminum and trimethylaluminum and mixtures thereof.

If a compound of the formula (XI) is used, it is preferably present in the catalyst solid in such an amount that the molar ratio of M from formula (XI) to Cr from the organometallic transition metal compound of the formula I a or I b is from 800:1 to 1:1, in particular from 200:1 to 2:1.

To avoid electrostatic charging of the polymer plant or the product, as is sometimes observed in polymerizations, an antistatic can be added to the reaction mixture. Suitable antistatics are dilute solutions of aliphatic alcohols, for example isopropanol, in paraffins such as n-heptane. Further suitable antistatics are commercially available as Stadis® grades from DuPont.

The present invention further provides highly branched ethylene polymers obtainable by the process of the present invention. For the purposes of the present invention, highly branched ethylene polymers are polymers having more than 5 methyl groups per 1000 carbon atoms, determined by IR spectroscopy. The polymers of the present invention preferably have more than 10 methyl groups/1000 carbon atoms, particularly preferably more than 20 methyl groups/1000 carbon atoms. The molecular weight distribution Q, defined as the molar mass $M_w$ divided by $M_n$, of the polymers of the present invention is in the range from 1.5 to 10, preferably from 1.8 to 3.5 and particularly preferably from 1.8 to 2.5. The molar mass $M_n$ of the highly branched ethylene polymers formed is usually in the range from 10 000 to 1 000 000, preferably in the range from 15 000 to 800 000 and particularly preferably in the range from 20 000 to 500 000.

The polymers of the present invention are very suitable for producing masterbatches for coloring plastics. The present invention further provides for the use of the polymers of the present invention in masterbatches for coloring plastics.

The pigment concentrates (masterbatches) of the present invention comprise the following components:

A) at least one pigment selected from among inorganic or organic pigments;

examples of inorganic pigments are zinc white, zinc sulfide, lithopone, lead white, lead sulfate, chalk, titanium dioxide;

iron oxide yellow, cadmium yellow, nickel-titanium yellow, chromium-titanium yellow, chromium yellow, lead chromate, bismuth vanadate, Naples yellow and zinc yellow;

ultramarine blue, cobalt blue, manganese blue, iron blue;

ultramarine green, cobalt green, chromium oxide (chromium oxide green);

ultramarine violet, cobalt violet, manganese violet;

ultramarine red, molybdate red, chromium red, cadmium red;

iron oxide brown, chromium-iron brown, zinc-iron brown, manganese-titanium brown;

iron oxide black, iron-manganese black, spinel black, carbon black;

orange-colored spinels and aluminas, cadmium orange, chromium orange, lead molybdate;

aluminum or Cu/Zn alloys;

Examples of organic pigments are metal phthalocyanines such as phthalocyanine blue or phthalocyanine green, also perylene red, diaryl yellow, isoindoline yellow, quinophthalone pigments, quinacridone pigments, benzimidazolone pigments, malachite green, thio indigo, monoazo pigments, disazo pigments, coated azo pigments, naphthol AS pigments, benzimidazolone pigments, diketopyrrolopyrroles, indanthrone, azo condensation pigments, diazo condensation pigments, anthraquinone pigments, pyrazolones, perinones, aminoketone pigments, indigo and triphenylmethane pigments;

Overviews of customary inorganic and organic pigments may be found, for example, in K. Leissler and G. Rösch, *Kunststoffe* 1996, 86, 965, and in *Ullmann's Enyclopädie der technischen Chemie*, 4th edition, keywords: pigments: introduction; Vol. 18, p. 547 ff., Organic Pigments, Vol. 18, p. 661 ff; Thieme Verlag Stuttgart, 1977; it is possible to produce concentrates comprising one pigment, but also blends comprising two, three or more different pigments;

B) the highly branched ethylene polymer obtainable by the process of the present invention;

C) if desired, a thermoplastic as carrier polymer, for example polyethylene, polypropylene, polystyrene, polyoxymethylene, polystyrene copolymers such as styrene-butadiene copolymers, acrylonitrile-butadiene-styrene terpolymers or polyvinyl chloride and also copolymers of ethylene with from 0.1 to 20 mol% of 1-butene, 1-pentene, 4-methyl-1-pentene, 1-hexene, 1-octene, 1-decene or 1-undecene;

D) if desired, from 0 to 10% by weight of additives, based on the total mass of the pigment concentrate, for example antioxidants; preference is given to antioxidants such as sterically hindered phenols or sterically hindered amines ("HALS"); very particularly preferably the Irganox• grades of sterically hindered phenols from Ciba.

The ratios of the various components can be varied within wide limits. The proportions are matched to one another so that altogether they add up to 100% by weight.

The pigment or the pigments are used in minimum amounts of 1% by weight, preferably 5% by weight and particularly preferably 10% by weight. Smaller proportions generally do not achieve sufficient color strength. 60% by weight may be regarded as an upper limit, while preference is given to 45% by weight, because the pigments are the most expensive constituent of the pigment concentrates.

The wax is used in an amount of at least 1% by weight, preferably at least 2% by weight, in pigment concentrates comprising carrier polymer, because below this proportion sufficient wetting of pigment and carrier polymer is not ensured. In pigment concentrations comprising a carrier polymer, preference is given to using a maximum of 30% by weight of wax, particularly preferably 20% by weight, because excessively high amounts of wax in the end product can impair the mechanical properties of the plastic molding or sheet to be colored. An appropriate upper limit in pigment concentrations to be produced without use of carrier polymer is 90% by weight. A practical minimum for the proportion of wax in a pigment concentrate which is free of carrier polymer is 40% by weight, since otherwise the concentrate becomes too expensive.

Carrier polymers are added if appropriate. In cases in which a carrier polymer is used, it is employed in a proportion of at least 30% by weight, because this aids the later mixing-in of the pigment concentrate in the production of plastic moldings and plastic sheets. An appropriate upper limit is 80% by weight.

Additives are added only if appropriate and then in small amounts. A sensible lower limit for antioxidants such as Irganox is 0.1% by weight, because below this amount significant oxidation protection is no longer possible; preference is given to 0.5% by weight and particular preference is given to 1% by weight. A practical upper limit is 5% by weight, because otherwise the processing properties of the pigment are visibly impaired by the low molecular weight component; preference is given to 2% by weight and particular preference is given to 1.5% by weight. A further class of additives consists of lead salts such as basic lead sulfate or lead stearate or mixtures thereof, which are added in proportions of, in each case, from 0.5 to 2% by weight, preferably from 1.0 to 1.5% by weight.

The polyolefin waxes obtained by one of the above-mentioned polymerization processes using a complex of the formula I a or I b can be processed further to produce masterbatches by various methods. In all these methods, wax and carrier polymer but not the pigment are melted in the decisive step, and the pigment or pigments and any additives used are incorporated.

Before actual mixing, the components may, if desired, be premixed, for which drum mixers or tumblers are particularly useful. Micronization can also be carried out if appropriate.

In the actual mixing procedure, a distinction is made between batchwise and continuous processes. For batchwise processes, simple kneaders can be used; continuous processes can be carried out, for example, in high-speed mixers, single-screw extruders, twin-screw extruders, Buss kneaders, planetary gear extruders, open cavity kneaders or high-speed stirrers.

The pigment concentrates are subsequently granulated in a customary manner. For this purpose, it is possible to use strand pelletizers in which the mixture is cooled under water as an extruded strand and is then cut into pellets or granules either while still in or after leaving the water bath. Furthermore, perforated plates are suitable as cutters ("die-face process").

To produce moldings and sheets, a mixture of
from 0.01 to 10% by weight of pigment concentrate, preferably from 0.5 to 5% by weight of pigment concentrate and particularly preferably from 0.5 to 2.5% by weight of pigment concentrate, with from 90 to 99.99% by weight of polymer to be colored, preferably from 95 to 99.5% by weight and particularly preferably from 97.5 to 98.5% by weight of polymer and, if desired, from 0 to 5% by weight of additives, with antioxidants or biocides being preferred additives, is prepared.

Polymers suitable as polymer to be colored are: polyethylene, polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, polyamides such as nylon-6 or nylon-6,6, thermoplastic polyurethanes, polyvinyl chloride and copolymers of ethylene with 0.1-20 mol % of 1-butene, 1-pentene, 1-hexene, 4-methyl-1-pentene, 1-octene, 1-decene or 1-undecene. The polymer to be colored and the carrier polymer of the masterbatch can be identical, but do not have to be.

To mix the pigment concentrates with the polymers and any desired additives, it is in principle possible to use the same methods as for producing the masterbatch itself. For batchwise processes, it is once again possible to use simple kneaders; continuous processes can be carried out, for example, in high-speed mixers, single-screw extruders, twin-screw extruders, Buss kneaders, planetary gear extruders, open double cavity kneaders or high-speed stirrers. Preference is given to using continuous processes.

The moldings and sheets can be produced by injection molding, film extrusion or casting at temperatures above the melting point of the polymer. The processing properties of the moldings and sheets produced according to the present invention are not adversely affected by use of the pigment concentrates of the present invention.

The moldings and sheets obtained according to the present invention differ from the commercially available moldings and sheets in that they have a significantly more brilliant color. The mechanical properties of the materials are not adversely affected by use of the pigment concentrates of the present invention.

The present invention is illustrated by the following examples:

General

The polymerization experiments were carried out in a 1 liter four-necked flask provided with contact thermometer, stirrer with Teflon blade, heating mantle and gas inlet tube (atmospheric-pressure experiments) or in a 10 liter steel autoclave from Büchi provided with automatic gas control, temperature control and stirrer (experiments under superatmospheric pressure).

The toluene used as solvent was distilled from Na/benzophenone.

As methylaluminoxane solution ("MAO"), use was made of a commercially available 1.6 molar toluene solution from Witco GmbH.

The complex was synthesized by the literature method (DE-A 197 10 615).

Atmospheric-Pressure Polymerization Experiments

From 5 to 20 μmol of the complex of the formula I a1 together with 250 ml of toluene were placed in a 1 liter four-necked flask provided with contact thermometer, stirrer with Teflon blade, heating mantle and gas inlet tube and the mixture was heated to the desired reaction temperature.

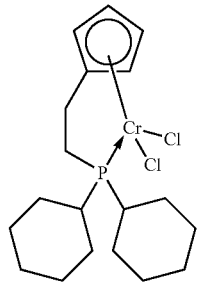

I a1

The indicated amount of MAO (methylaluminoxane) was subsequently added and 20-40 l/h of ethylene were passed through the mixture. The reaction temperature was kept constant by cooling.

The reaction was stopped by addition of a mixture of 15 ml of concentrated aqueous HCl and 50 ml of methanol and the content of the flask was stirred for 15 minutes. A further 250 ml of ethanol were then added to precipitate the product and the mixture was stirred for another 15 minutes. The product was filtered off, washed three times with methanol and dried to constant weight at 70° C. The results are shown in Tables 1 and 2.

TABLE 1

| | | | polymerization results | | | | |
|---|---|---|---|---|---|---|---|
| Experiment No. | Complex [mg; mmol] | MAO [mmol] | Al: Cr | $T_{poly}$ [° C.] | $t_{poly}$ [min] | Yield of PE [g] | Activity [kg PE/mol Cr · h] |
| 1 | 10.6; 25.7 | 12.9 | 500 | 40 | 30 | 24.2 | 1880 |
| 2 | 8.0; 19.4 | 97 | 500 | 60 | 60 | 14.4 | 740 |

Abbreviations used:
PE: polyethylene,
t: time,
$Q = M_w/M_n$

TABLE 2 polymer analysis

| Experiment No. | Density [kg/m³] | η [dl/g] | $M_w$ [g/mol] | $M_n$ [g/mol] | Q | M.p. [° C.] | $CH_3$ [#/1000 C] |
|---|---|---|---|---|---|---|---|
| 1 | 920.8 | 1.08 | 59354 | 21392 | 2.17 | 112.1 | 21 |
| 2 | 907.7 | 0.56 | 23925 | 9560 | 2.49 | 105.1 | 24 |

TABLE 3-continued polymerization results using supported catalyst

| Experiment No. | Catalyst [mg] | BOMag [mg] | $T_{poly}$ [° C.] | p [bar] | $t_{poly}$ [min] | Yield of PE [g] | Productivity [g PE/g cat.] |
|---|---|---|---|---|---|---|---|
| 10 | 250 | 80 | 70 | 30 | 60 | 31 | 120 |
| 11 | 314 | 80 | 70 | 13 | 45 | Only partial polymerization | |

TABLE 4 polymer analysis

| Experiment No. | Density [kg/m³] | η [dl/g] | M.p. [° C.] | Total $CH_3$ [#/1000 C] | Trans-CH=CH—$CH_3$ [#/1000 C] | —CH=$CH_2$ [#/1000 C] | Vinylidene [#/1000 C] |
|---|---|---|---|---|---|---|---|
| 3 | 929.6 | 9.19 | 128.1 | 6.9 | 0.04 | 0.36 | 0.04 |
| 4 | 923.1 | >50 | 127.9 | 5.5 | 0.01 | 0.37 | 0.01 |
| 5 | 918.7 | 14.21 | 124.3 | 11.0 | 0.03 | 0.44 | 0.01 |
| 6 | 927.5 | >50 | 125.4 | 7.0 | 0.01 | 0.35 | 0.02 |
| 7 | 928.2 | 4.31 | 129.3 | 9.2 | 0.04 | 0.31 | <0.01 |
| 8 | 929.7 | 35.87 | 126.5 | 8.4 | 0.05 | 0.34 | <0.01 |
| 9 | 911.9 | 1.93 | 139.0 | 18.3 | 0.19 | 1.26 | 0.1 |
| 10 | 923.6 | 16.47 | n.d. | 9.8 | 0.01 | 0.35 | 0.1 |

Application of the Complex I a1 to a Support 3.8 g of silica gel ES 70× from Crosfield (baked at 130° C. for 12 hours) were placed in a 250 ml four-necked flask which had been made inert and was fitted with a Teflon stirrer.

In a 100 ml conical flask, 109.7 mg (266 μmol) of complex I a1 were stirred in 7.2 ml of MAO solution in toluene (30% by weight from Witco) for 15 minutes until a homogeneous, dark violet solution had been formed. This solution was added dropwise to the silica gel whilst stirring. The resulting suspension was stirred at room temperature for 1 hour and subsequently dried under reduced pressure until a free-flowing powder had been formed. Yield: 7.0 g a a light-violet powder.

Polymerization using the Supported Complex I a1 40 or 80 mg (see table) of BoMag solution (0.12 mol/l of butyloctylmagnesium, commercially available from Witco GmbH) was firstly placed in a 10 l steel autoclave fitted with a stirrer. 400 ml of liquid isobutane were subsequently introduced and the mixture was heated to the indicated temperature whilst stirring. The weighed amount of catalyst was then suspended in a few (5-10) ml of heptane and injected via a lock. The desired ethylene pressure was set and polymerization was carried out for the time indicated while continuing to stir. The polymerization was stopped by venting and the polymer was dried under reduced pressure.

TABLE 3 polymerization results using supported catalyst

| Experiment No. | Catalyst [mg] | BOMag [mg] | $T_{poly}$ [° C.] | p [bar] | $t_{poly}$ [min] | Yield of PE [g] | Productivity [g PE/g cat.] |
|---|---|---|---|---|---|---|---|
| 3 | 180 | 40 | 60 | 40 | 60 | 38 | 210 |
| 4 | 156 | 40 | 70 | 40 | 60 | 40 | 260 |
| 5 | 160 | 40 | 90 | 40 | 60 | 20 | 125 |
| 6 | 169 | 40 | 70 | 30 | 60 | 23 | 140 |
| 7 | 218 | 80 | 70 | 40 | 60 | 59 | 270 |
| 8 | 182 | 80 | 70 | 40 | 60 | 48 | 260 |
| 9 | 224 | 80 | 90 | 40 | 60 | 30 | 130 |

We claim:

1. A process for preparing highly branched ethylene polymers, which comprises polymerizing ethylene over a catalyst system comprising a compound of the formula I a or I b

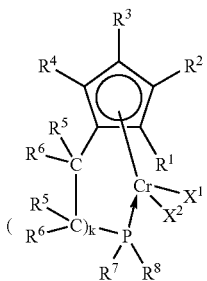

I a

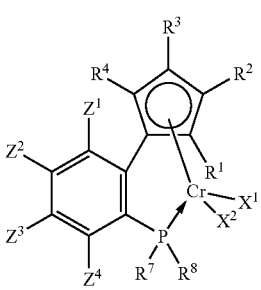

I b and an activator, where the variables in the formulae I a and I b are defined as follows:

$X^1$, $X^2$ are identical or different and are selected form the group consisting of halide, trifluoroacetate, $BF_4^-$, $PF_6^-$ or $SbF_6^-$, $C_1$-$C_8$-alkyl, $C_7$-$C_{13}$-aralkyl, $C_6$-$C_{14}$-aryl, $C_1$-$C_6$-alkoxy and $NR^9R^{10}$, where $R^9$ and $R^{10}$ are selected independently from the group consisting of hydrogen, $C_2$-$C_{12}$- alkenyl and $C_6$-$C_{14}$-aryl, which may from a saturated or unsaturated 5- to 10-membered ring;

$R^1$-$R^6$ are identical or different and are selected from the group consisting of hydrogen, $C_1$-$C_8$-alkyl, substituted or unsubstituted, $C_3$-$C_{12}$-cycloalkyl, substituted or unsubstituted, $C_2$-$C_{12}$-alkenyl, $C_7$-$C_{13}$-aralkyl, $C_6$-$C_{14}$-aryl, unsubstituted or substituted by one or more identical or different substitutents selected from the group consisting of $C_1$-$C_8$-alkyl, substituted or unsubstituted, $C_3$-$C_{12}$-cycloalkyl, $C_7$-$C_{13}$-aralkyl, $C_6$-$C_{14}$-aryl, halogen, $C_1$-$C_6$-alkoxy, $C_6$-$C_{14}$-aryloxy, $SiR^{11}R^{12}R^{13}$ and $O\!-\!SiR^{11}R^{12}R^{13}$, where $R^{11}$ to $R^{13}$ are selected from the group consisting of $C_1$-$C_8$-alkyl, $C_3$-$C_{12}$-cycloalkyl, $C_7$-$C_{13}$-aralkyl or $C_6$-$C_{14}$-aryl k is 0, 1, 2 or 3, $Z^1$-$Z^4$ are identical or different and are selected from the group consisting of hydrogen, $C_1$-$C_8$-alkyl, substituted or unsubstituted, $C_3$-$C_{12}$-cycloalkyl, substituted or unsubstituted, $C_2$-$C_{12}$-alkenyl, halogen, $NO_2$, $C_7$-$C_{13}$-aralkyl and $C_6$-$C_{14}$-aryl, and $R^7$, $R^8$ are identical or different and are selected from the group consisting of branched $C_3$-$C_8$-alkyl, $C_3$-$C_{12}$-cycloalkyl, and a-substituted $C_3$-$C_{12}$-alkenyl, and the process is carried out at from 50 to 110° C. and a pressure of from 10 to 100 bar.

2. A process as claimed in claim 1, wherein the variables in formula Ia are defined as follows:

$X^1$, $X^2$ are selected from the group consisting of halogen and $BF_4^-$, $R^1$-$R^6$ are identical or different and are selected from the group consisting of hydrogen, $C_1$-$C_8$-alkyl and $C_6$-$C_{14}$-aryl, $R^7$, $R^8$ are identical and are selected from the group consisting of isopropyl, cyclopentyl and cyclohexyl.

3. A process as claimed in claim 1, wherein the variables are defined as follows:

$X^1$, $X^2$ are each chlorine, $R^7$, $R^8$ are each cyclohexyl.

4. A process as claimed in claim 1, wherein the catalyst system is immobilized on a solid support material prior to the polymerization.

5. A process as claimed in claim 1, wherein the catalyst system is reacted with a compound of the formula (XI),

$$M(R^A)_r(R^B)_s(R^C)_t \qquad (XI)$$

where

M is selected from the group consisting of an alkali metal, an alkaline earth metal and a metal of group 13 of the Periodic Table, $R^A$ is selected from the group consisting of hydrogen, $C_1$-$C_{10}$-alkyl, $C_6$-$C_{15}$-aryl and alkylaryl, or arylalkyl each having from 1 to 10 carbon atoms in the alkyl part and from 6 to 20 carbon atoms in the aryl part, $R^B$ and $R^C$ are selected from the group consisting of hydrogen, halogen, $C_1$-$C_{10}$-alkyl, $C_6$-$C_{15}$-aryl and alkylaryl, arylalkyl or alkoxoy each having from 1 to 10 carbon atoms in the alkyl part and from 6 to 20 atoms in the aryl part, r is an integer from 1 to 3 and s and t are integers from 0 to 2, where the sum r+s+t correspond to the valence of M.

6. A process as claimed in claim 1, wherein the process is carried out at from 70 to 110° C.

7. A process as claimed in claim 1, wherein the process is carried out at a pressure of from 15 to 80 bar.

8. A process as claimed in claim 1, wherein the process is carried out at a pressure of from 20 to 75 bar.

9. A process as claimed in claim 1, wherein the ethylene has more than 20 methyl groups per 1000 carbon atoms.

10. A process as claimed in claim 5, wherein the compound of formula (XI) is n-butyllithium, n-butyl-n-octylmagnesium, n-butyl-n-heptylmagnesium, tri-n-hexylaluminum, tri-isobutylaluminum, triethylaluminum, trimethylaluminum or a mixture thereof.

11. A process for preparing a masterbatch for coloring plastics, said process comprising mixing components consisting of A) at least one organic or inorganic pigment, B) the highly branched ethylene polymer obtained by the process of claim 1, C) optionally, a thermoplastic as carrier polymer, and D) optionally from 0 to 10% by weight of additives, based on the total mass of the pigment concentrate.

12. A process as claimed in claim 1, wherein the highly branched ethylene polymers prepared have more than 10 methyl groups/1,000 carbon atoms.

13. Highly branched ethylene polymers prepared by the process of claim 1 having more than 10 methyl groups/1,000 carbon atoms.

14. A process as claimed in claim 1, wherein the catalyst system comprises a compound of the formula I a, and wherein the process is carried out at from 80 to 110° C.

* * * * *